United States Patent [19]

Morgan

[11] Patent Number: 4,852,354

[45] Date of Patent: Aug. 1, 1989

[54] EXTERNAL COMBUSTION CLOSED REGENERATIVE CYCLE PISTON ENGINE

[76] Inventor: George R. Morgan, 1831 S. Berthed Pl., Tucson, Ariz. 85710

[21] Appl. No.: 210,356

[22] Filed: Jun. 23, 1988

[51] Int. Cl.[4] .......... F02C 1/04; F02G 1/00

[52] U.S. Cl. .......... 60/682; 60/650

[58] Field of Search .......... 60/650, 682, 508–515

[56] References Cited

U.S. PATENT DOCUMENTS

| | | | |
|---|---|---|---|
| 2,067,453 | 1/1937 | Lee | 60/682 |
| 2,893,888 | 6/1958 | Mallory | 60/514 |
| 3,956,894 | 5/1976 | Tibbs | 60/682 X |
| 4,120,161 | 10/1978 | Gedeit | 60/682 |

*Primary Examiner*—Allen M. Ostrager

[57] ABSTRACT

The prime mover is a high power output, environmentally clean, efficient, multi-fueled, external combustion, closed regenerative cycle piston engine with practically no dirt ingestion and minimal acoustic, thermal and smoke signatures. The engine consists of five major units: the heat exchanger, heater, accumulator, compressor and power units. The engine operates on one power stroke per revolution with an unidirectional mass flow of the working fluid decreasing engine design complexity. The engine's design concept incorporates a flexibility in the choice or design of the major units, and, therefore, offers an efficient and practical maintenance and repair program. The unique heater units have the capability of developing different types of thermodynamic cycles while using a variety of working fluids. The engine can be fabricated with off-the-shelf materials, ceramics or other adiabatic types of high temperature materials.

3 Claims, 9 Drawing Sheets

EXTERNAL COMBUSTION CLOSED REGENERATIVE CYCLE PISTON ENGINE

OBJECT OF THE INVENTION

The object of this invention is to provide a fuel efficient, multi-fuel, environmentally clean, high power output, external combustion closed regenerative cycle piston engine, with practically no dirt ingestion and minimal acoustic, thermal and smoke signatures.

Another object of the invention is to achieve a flexibility in the choice or design of compressors and heat exchangers and the capability of producing different types of thermodynamic cycles while using a variety of working fluids.

Another object of the invention is to provide an engine that can be fabricated with off-the-shelf liquid cooled metal to ceramics or other adiabatic types of high temperature materials. Tribology of the engine, depending on the choice of materials can vary from a liquid to exotic types of coatings on the sliding components, to the introduction of a specified amount of graphite or similar colloidal lubricating material into the working fluid.

The engine consists of five major units: the compressor, heater, accumulator, heat exchanger and power units. See FIG. 1 and 2. The control mechanism, starter, fuel tank and make-up working fluid tank are considered peripheral and are not shown.

FIG. 8 is a drawing of a four cylinder inline engine demonstrating the flexibility of the embodiment of the invention to many types of multi cylinder configurations.

Being a fluid breathing machine the characteristics of the engine will be a function of the dynamics of the working fluid. The engine operates on one power stroke per revolution with an unidirectional mass flow of the working fluid which reduces friction losses and keeps the inertia forces of the working fluid lower.

The mass flow of the working fluid through the prime mover will begin at the accumulator unit. The compressor unit moves a controlled amount of working fluid from the accumulator unit, compresses and discharges it into the heat exchanger unit absorbing residual heat, and then the working fluid moves into the heat unit where it is heated and expanded in the power unit doing work. The power unit exhausts the working fluid through the heat exchanger unit depositing heat, through the cooler further reducing the working fluid's energy level and into the accumulator unit completing the working fluid mass flow of a closed regenerative cycle. See FIG. 1 and 2.

Working fluid leakage in the system is inevitable and a working fluid make-up tank, depending on the type of working fluid, will insure the accumulator unit to meet the demands of the engine.

During operation of the prime mover the working fluid is discharged from the power unit at a high velocity and high turbulence, which increases the film coefficient in the heat exchanger unit and raises the thermal efficiency of the engine. In FIG. 3 the power unit exhausts the working fluid by a port in the bottom of the cylinder. This configuration eliminates the power units control in developing different thermodynamic cycles. FIG. 5 shows a cam or solenoid operated exhaust valve located in the power cylinder, which under command varies the amount of working fluid left in the cylinder of the power unit during the compression stroke, which changes the lower portion of the thermodynamic cycle.

The accumulator unit acts like a reservoir or pool by holding a majority of the working fluid. The power unit dumps into it and the compressor unit withdraws from it. Under steady state conditions a prefixed amount of working fluid is maintained in the accumulator unit by keeping a specified working fluid temperature and pressure. The accumulator unit's pressure and temperature is kept lower than the other major units in the system. Make-up working fluid is injected into the accumulator unit to keep the pressure and temperature from going below a specified minimum. Due to the working fluid leaking past the piston rings, the crankcase could build up pressure and cause a problem. A filtering system that removes unwanted substances from the working fluid in the crankcase is piped back into the accumulator unit.

The compressor unit is a piston, centrifugal or similar type multi-stage unit designed to meet the maximum pressure, temperature and mass flows required of a high mep, closed regenerative cycle engine. Power density is a function of the pressure, temperature and amount of working fluid in the heater and heat exchanger units. The higher the discharge pressure of the compressor unit, as it pressurizes the heat exchanger and heater unit, will determine the mep created in the power unit. The compressor unit works independent of the power unit taking working fluid from the accumulator unit and compressing it to a specified pressure and temperature in the heat exchanger and heater units. This is achieved by a clutch type coupling, see FIG. 2, between the power and compressor units. Determination of the amount of energy required for interstage cooling of the compressor unit, versus the energy required in the heater unit to maintain a specified temperature can be designed into the system making a very efficient prime mover.

A standard or designed high temperature and pressure heat exchanger unit is mounted between the accumulator, heater and power units. A single pass shell type heat exchanger is shown in FIG. 2.

As the efficiency of the engine and thermodynamic cycle is dependent on the regeneration of the heat exchanger unit, careful consideration must be given to this unit. In case the heat exchanger unit doesn't reduce the temperature and pressure of the working fluid enough, a cooler placed in series, see FIG. 2, with the heat exchanger and accumulator units reduce the temperature and pressure to the required amount. The cooler can be liquid or air cooled depending on the amount of energy to be removed.

The heater unit is designed with fins in place of small tubes, making it compact and less expensive. As the working fluid enters the heater unit under pre-determined pressure and temperature, a high speed rotary blower or equivalent component, see FIG. 3, forces the working fluid through the heater unit repeatedly, absorbing energy each time it circulates. A revolving cylindrical drum having a high emissivity, see FIG. 4, is heated on the surface by burners and rotates adjacent to and radiates to fins which have a high absorptivity, increasing their temperature. The fins increase the surface area, see FIG. 6 and 7, and enables the working fluid to contact more heated surfaces increasing the amount of working fluid heated. As the load and RPM of the engine increase the amount of working fluid must increase. The thermal conductivity of the working fluid is an important factor and must be chosen carefully.

Seals on the drum shafts and the main burner seal, which contact the rotating drum and seal holder, minimizes leakage of the working fluid to the atmosphere.

Two other types of heater units whose object is to reduce the complexity, cost, and increase the reliability of the heater unit are:

1. Mount a stationary finned cylinder in the heater housing cavity replacing the revolving heater drum, motor, housing fins and components. See FIG. 6 and 7. A multi-faced burner heats the inside of the finned cylinder transmitting the heat by conduction to the outer surfaces which transfers it by radiation to the inside surface of the heater housing cavity.

2. Replace external heated revolving drum with an internal heated blower. See FIG. 14, and 5. A single burner heats the inside of the heater blower transferring the heat by conduction to the outer surfaces of the blower which transfers it by radiation to the heater housing fins. The only moving component in the above heater units are the heater blowers moving working fluid over the heated surfaces. Because of the high temperature an air motor and air bearings can be used. The heater unit does not have to be part of the power cylinder; it could be a separate unit.

Many types of fuels can be used for the burner. The burner residue vents to the environment or through any type of system needed to eliminate smoke signatures.

Another unique feature of the engine is the ability to develop different types of thermodynamic cycles. The prime movers major units are capable of producing regenerative large expansions with small percentage cut-offs to a constant pressure expansion depending on the load and RPM and be plotted on the standard pressure versus displacement and temperature versus displacement graphs. A power cylinder intake poppet valve located in the heater housing, see FIG. 9, and actuated by a cam or solenoid replacing the intake valve shown in FIG. 3 and 5 demonstrates the flexibility of the design.

Regulation of the engine and the above types of thermodynamic cycles are achieved by (1) the control valve on the suction side of the compressor, (2) the intake valve in the power unit cylinder, (3) varying the RPM of the heated cylindrical drum, (4) controlling the RPM of the working fluid blower, (5) modulating the heat output of the burner.

The working fluid output of the compressor unit matches that of the power unit working fluid exhaust at steady state conditions unless there are flow losses and leakage in the piping, heat exchanger and heater units. If a high temperature durable compressor unit is utilized the heat exchanger unit could be placed on the suction side of the compressor unit leaving only the heater unit to be pressurized.

In the start-up mode the compressor unit pressurizes the heat exchanger and heater units as the heater unit starts to heat the working fluid, before the power unit can operate. When equilibrium and a specified pressure and temperature is reached the power unit is ready to start.

As the RPM and load increase during acceleration the controls that govern the modulation of the burners, RPM of the working fluid blower and cylindrical drum and working fluid mass flow increase to the capacity needed to meet the new power demands of the engine. The power unit intake valve releases more working fluid into the power cylinder reducing the amount of working fluid in the heater unit creating a loss of pressure in the heat exchanger and heater units, resulting in a temporary imbalance or lowered pressure in the accumulator unit.

In the deceleration mode the heat exchanger and heater units dump excessive amounts of working fluid into the accumulator unit to keep the pressure from increasing past design limits. Only in the acceleration mode is there an imbalance of working fluid in the accumulator unit. The proper design of the accumulator unit will insure adequate working fluid to the system whatever mode of operation is demanded by the engine.

The application of the engine can be for civil or military transportation, work vehicles, industrial power generation and many other commercial and military uses.

DETAILED DESCRIPTION

Figure 2:
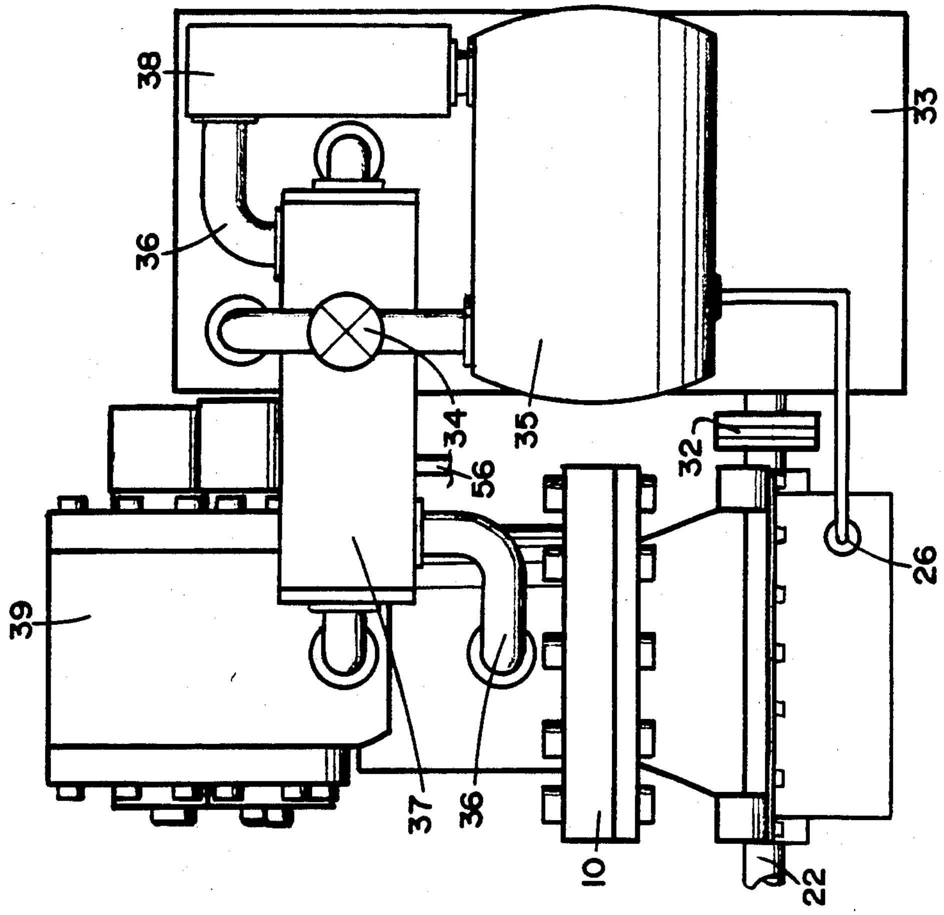
FIG. 2 is a side elevation view of the engine showing all of the five major units and components.

The engine consists of five major units, the power 10, compressor 33, accumulator 35, heater exchanger 37, and heater units 39, 67 and 68. As previously stated the make-up working fluid tank, starter, control mechanism and fuel tank are considered peripheral components and are not discussed herein. See FIG. 1 and 2.

Figure 5:
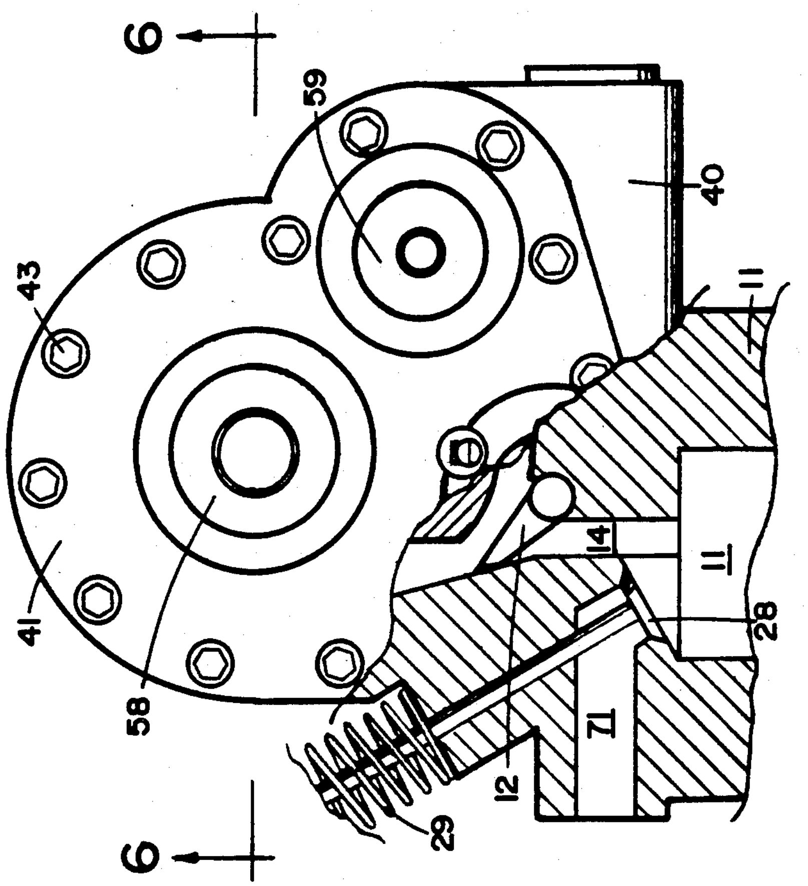
FIG. 5 is a front cut-away view of the engine showing an exhaust valve in the power cylinder and related components.

The power unit 10 is composed of a power cylinder 11, a power cylinder intake valve 12 located in the power cylinder intake valve passage 14 that communicates between the power cylinder 11 and the heater unit 39 and controlled by the power cylinder intake valve actuator 13. An exhaust port 16 located on one side and near the bottom of the power cylinder 11 is uncovered by the power piston 17, which incorporates the power piston rings 18 and wrist pin 19. For diversity a power cylinder exhaust valve 28, valve spring 29, with some type of controlled actuator can be utilized to develop different types of compression stroke thermodynamic cycles. See FIG. 5. The power cylinder 11 is attached to the power crankcase 20 by bolts 21. The power crankshaft 22 is attached to the power piston 17 by the power connecting rod 23 and piston wrist pin 19. The power crankcase pan 24 is attached by bolts 25 to the crankcase 20 and holds the power crankcase breather 26 and breather tube 27 that communicates to the accumulator unit 35.

The accumulator unit 35 is located adjacent and attached to the compressor unit 33. See FIG. 1 and 2. The accumulator unit 35 connects and communicates by piping 36 to the cooler 38 and heat exchanger unit 37. The accumulator unit 35 is also connected and communicates by piping 36 to the compressor intake valve control 34 and compressor unit 33.

The compressor unit 33 is attached to the power unit 10 by a power/compressor coupling 32, located between the units on the power crankshaft 22 axis. See FIG. 2. The compressor unit 33 connects and communicates by piping 36 to the heat exchanger unit 37, the compressor intake valve control 34, and accumulator unit 35.

The heat exchanger unit 37 is attached by piping 36 to the heater 39 and power 10 units on one end, see FIG. 2, and attached by piping 36 to the compressor unit 33 and cooler 38 on the opposite end and located adjacent to the compressor unit 33.

Figure 1:
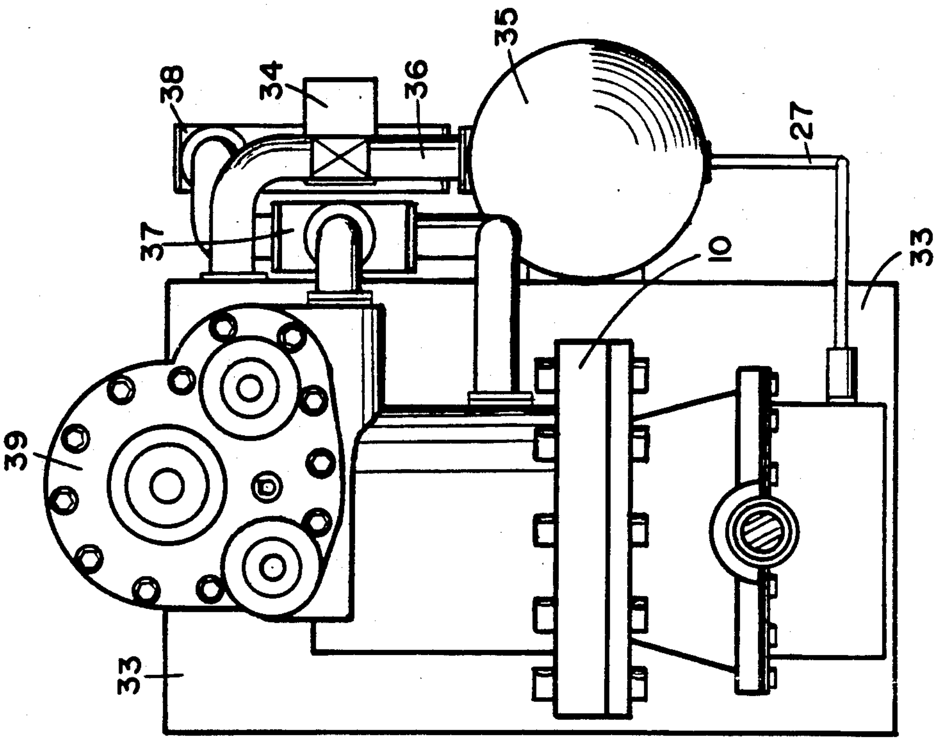
FIG. 1 is a front elevation view of the engine showing the power, heater, compressor, heat exchanger, and accumulator units, plus piping and components.
Figure 3:
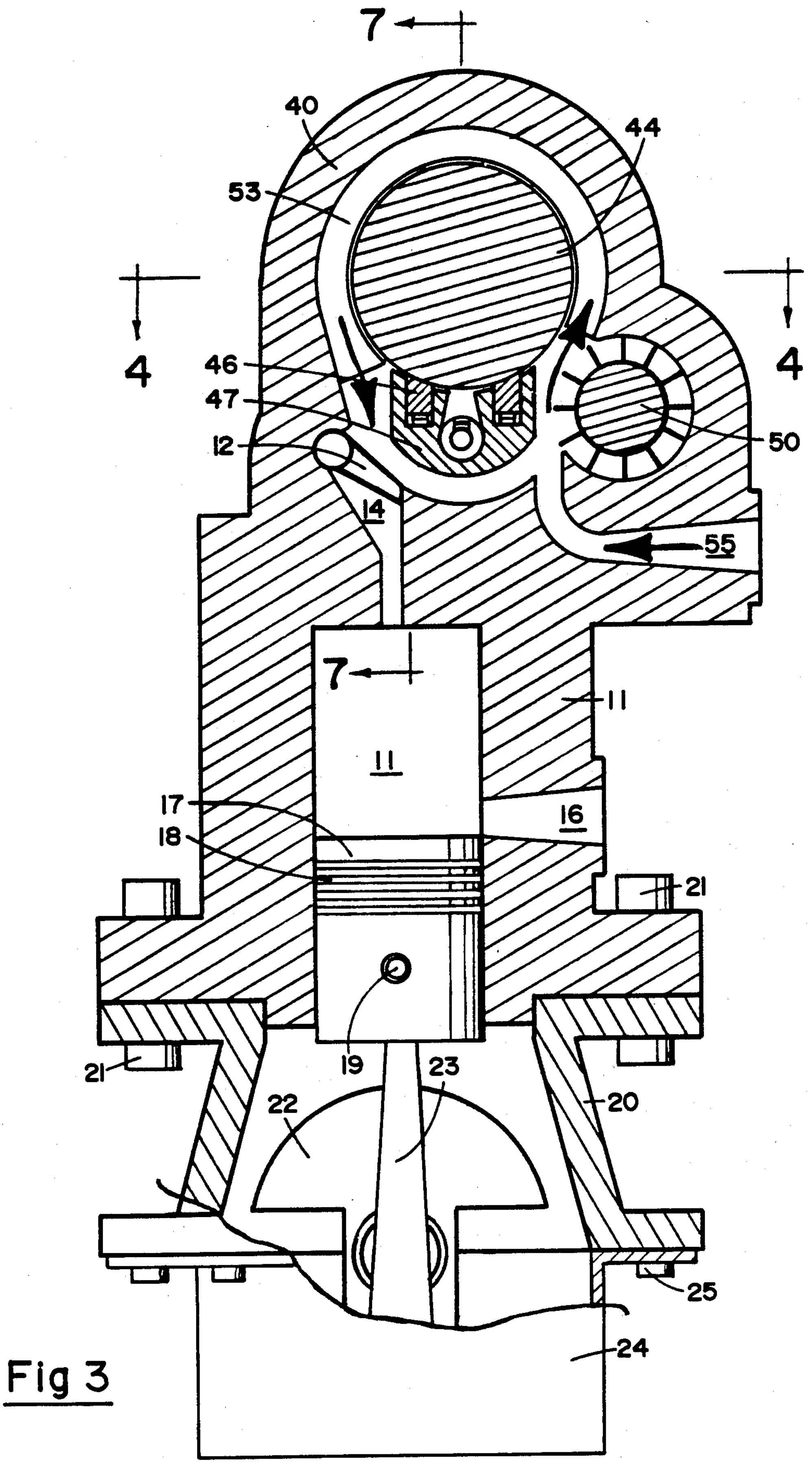
FIG. 3 is a front sectional view of the engine showing the circulating path of the working fluid over the rotating heater drum, heater housing fins, heater drum seal holder, power cylinder intake valve and rotating heater blower. It also shows the crankshaft, connecting rod, piston and cylinder in relationship to the heater unit.
Figure 4:
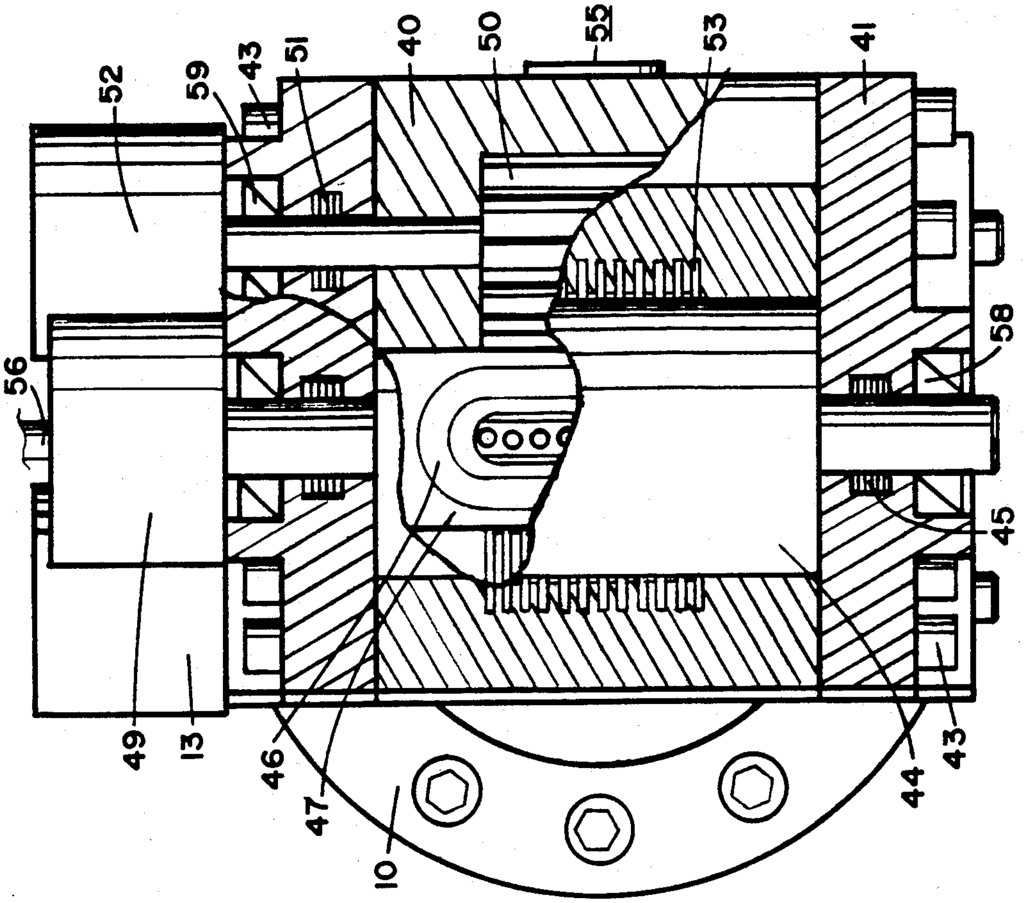
FIG. 4 is a plan cut-away view of the engine taken along the line 4—4 of FIG. 3, showing the burner, heater drum seal, heater blower, heater housing fins, heater drum and motor, bearings and heater drum shaft seals.
Figure 7:
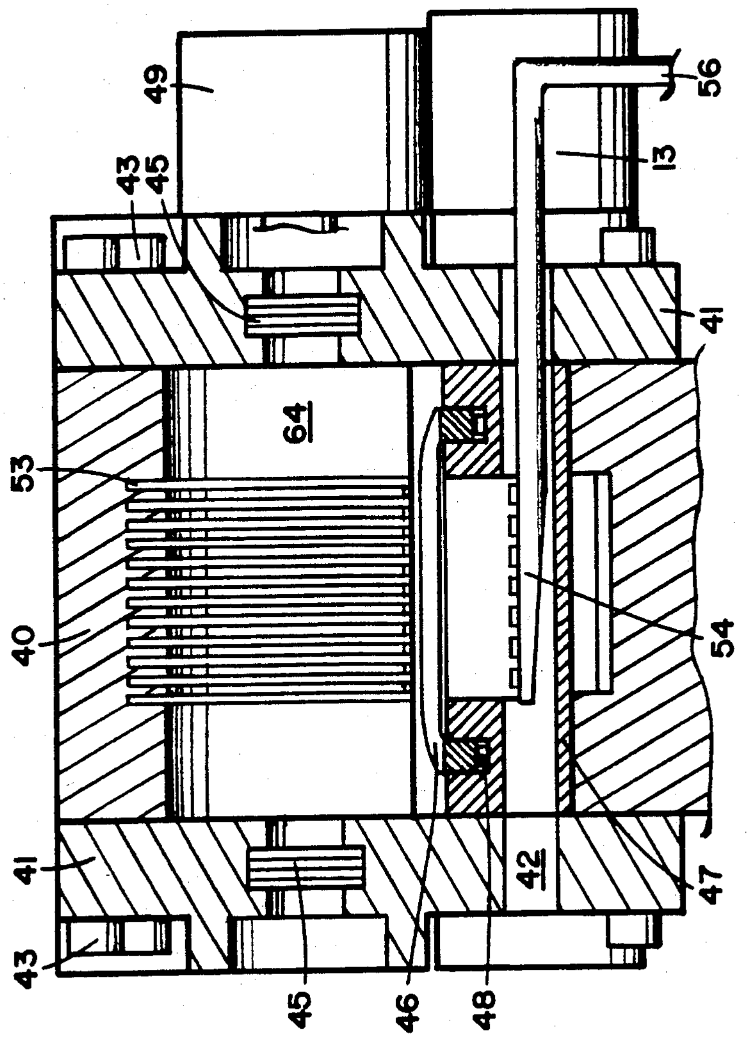
FIG. 7 is a side sectional view of the heater unit taken along the line 7—7 of FIG. 3 with the heater drum removed showing the burner, heater drum seal and spring, heater drum seal holder, heater housing cavity and motors.
Figure 6:
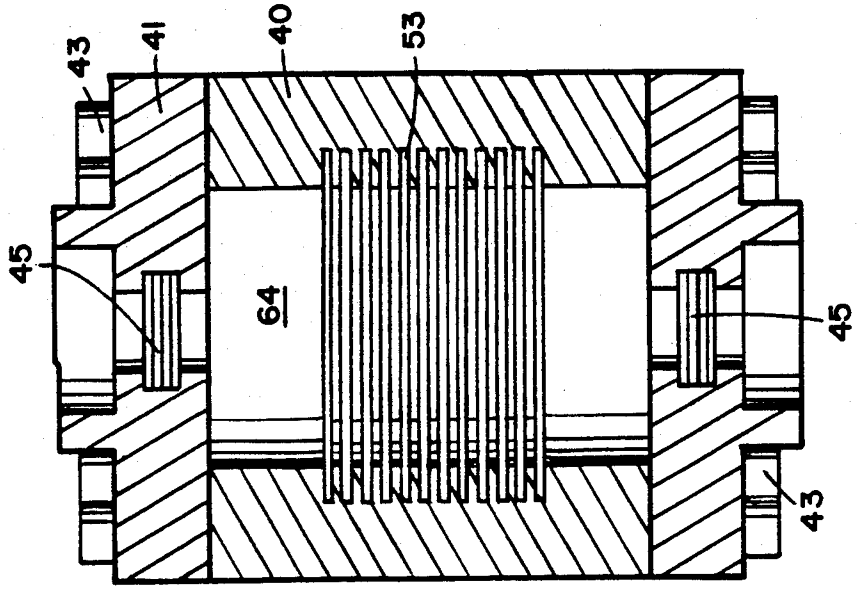
FIG. 6 is a sectional view of the heater housing taken along the line 6—6 of FIG. 5, with the heater drum removed showing the heater housing fins, heater housing cavity and heater flange plates plus bolts.
Figure 8:
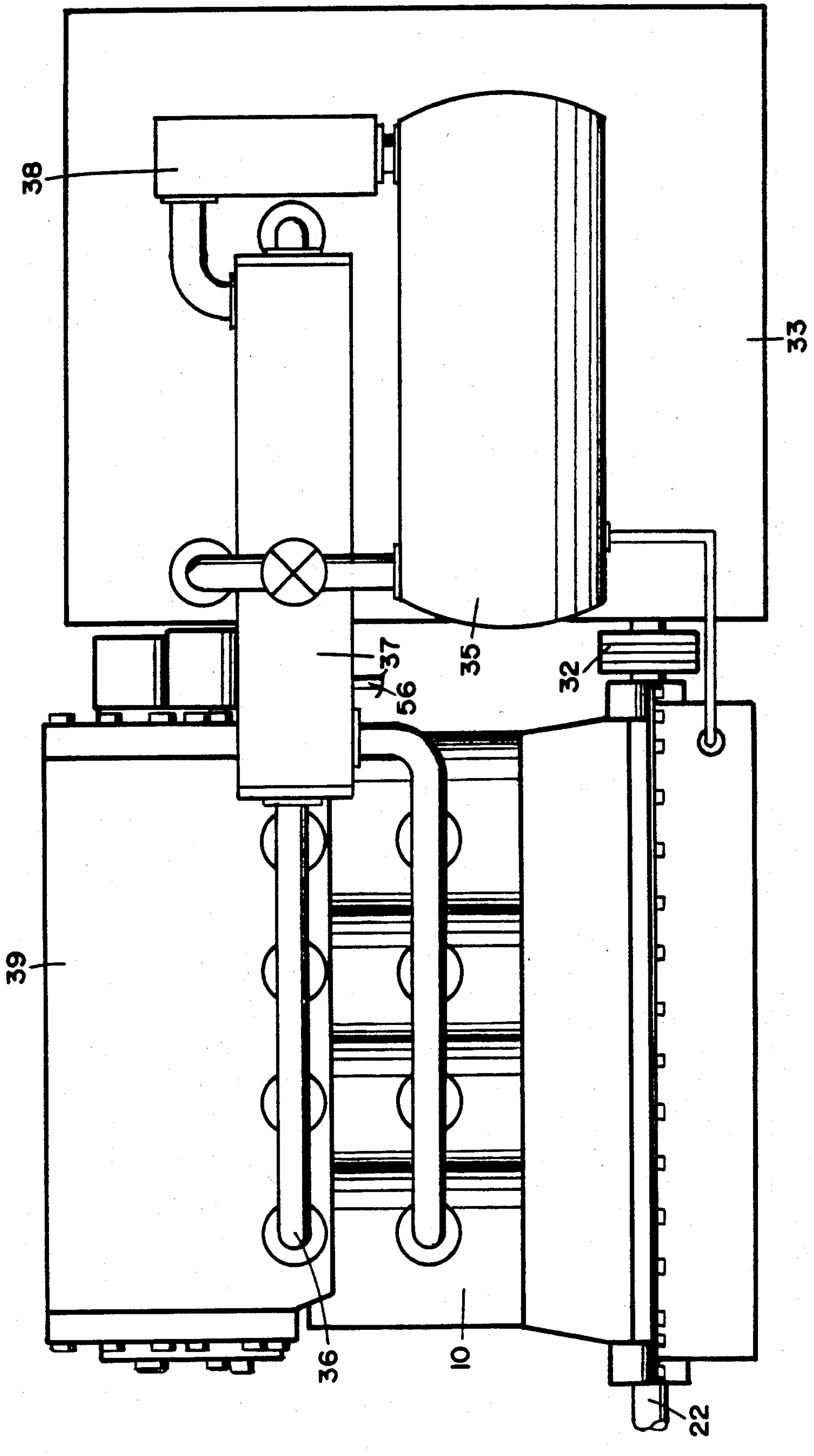
FIG. 8 is a side elevation view of a four cylinder engine showing the major units, piping and components.
Figure 9:
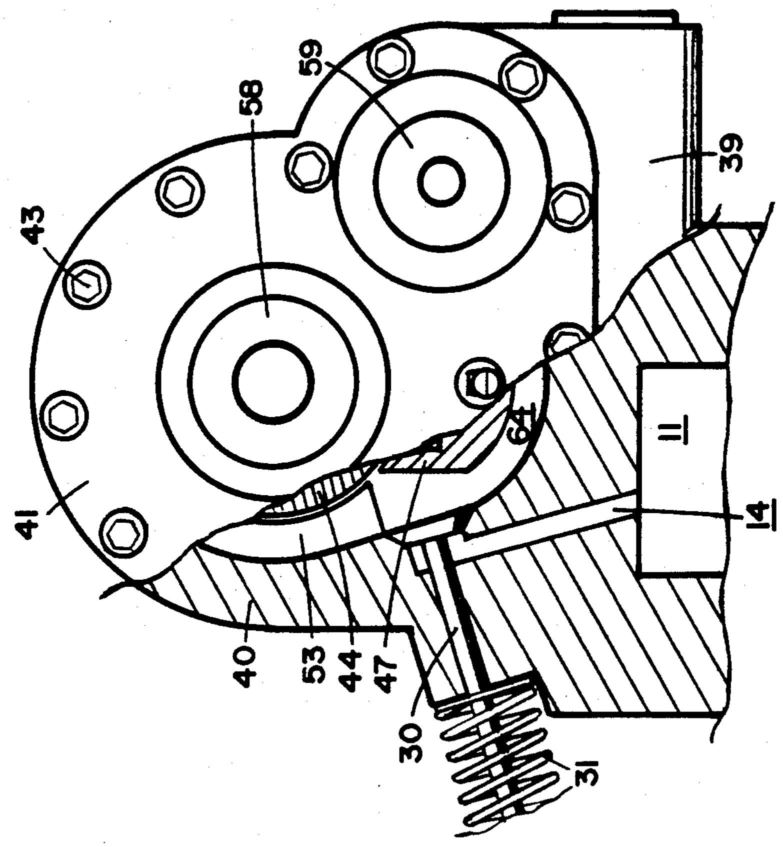
FIG. 9 is a front cut-away view of the heater unit showing a power cylinder intake poppet valve located in the heater housing.

FIG. 1 through 3 shows the heater unit 39 as an integral part of the power unit 10 located directly above the power cylinder 11. The heater unit 39 is composed of the heater housing 40 which incorporates the power cylinder intake valve 12 located in the power cylinder intake valve passage 14, the heater intake port 55, the heater housing fins 53, the heater drum 44, the heater blower 50 and heater drum seal holder 47. See FIG. 3, 4, 6 and 7. The heater flange plates 41 are attached to the heater housing 40 by bolts 43 located on either side of the heater housing 40 and incorporates the heater drum shaft seals 45, blower shaft seals 51 and power cylinder intake valve shaft seals 15. The power cylinder intake valve actuator 13 and bearings 57 , the heater drum motor 49 and bearings 58 and the heater blower motor 52 and bearings 59 are also mounted on the heater flange plates 41. FIG. 4 & 7 show how the heater drum seal holder 47 incorporates the heater drum seal 46 and heater drum seal springs 48. The heater drum seal holder 47 is fixed in the heater flange plates 41 and located in the heater housing 40. The heater drum seal holder 47 and heater flange plate 41 have an opening that allows the heater burner 54 and fuel line 56 to be mounted and also vent the combustible fumes. See FIG. 7.

Figure 10:
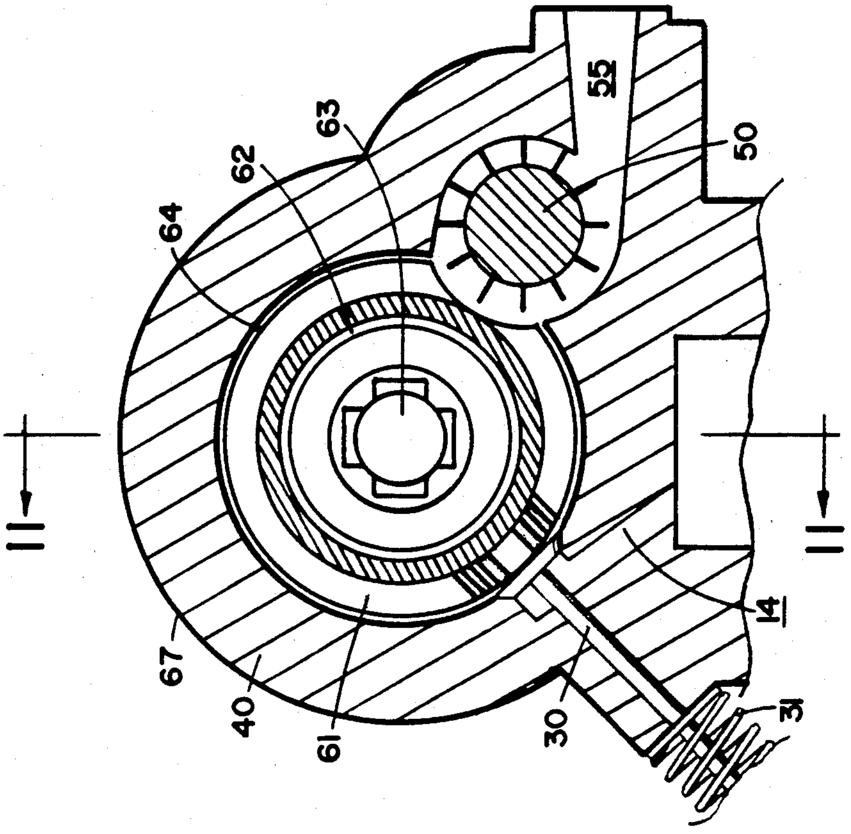
FIG. 10 is a front sectional view of the heater unit showing a heated stationary finned cylinder, heater housing cavity, heater blower, heater intake port, burner, intake poppet valve and power cylinder.

FIG. 10 shows another type of heater unit 67. A non-rotating finned cylinder 61 is placed in the heater housing cavity 64 and sealed against working fluid leakage by seals 62 located in the heater flange plate 41 that are attached to the heater housing 40 by bolts 43. A multi-faced burner 63 is mounted inside and heats the finned cylinder 61. Flue gas is eliminated by the heater flange plate opening 42. The heater blower 50 picks up the cooler working fluid from the heat exchanger unit 37 and circulates the combined working fluid over the heated surfaces of the finned cylinder 61 and heater housing cavity 64. The heater unit intake poppet valve 30 located in the heater housing cavity 64, and held in the closed position by the valve spring 31, to insure no working fluid escaping in/out of the power cylinder 11 and actuated by means not shown.

Figure 12:
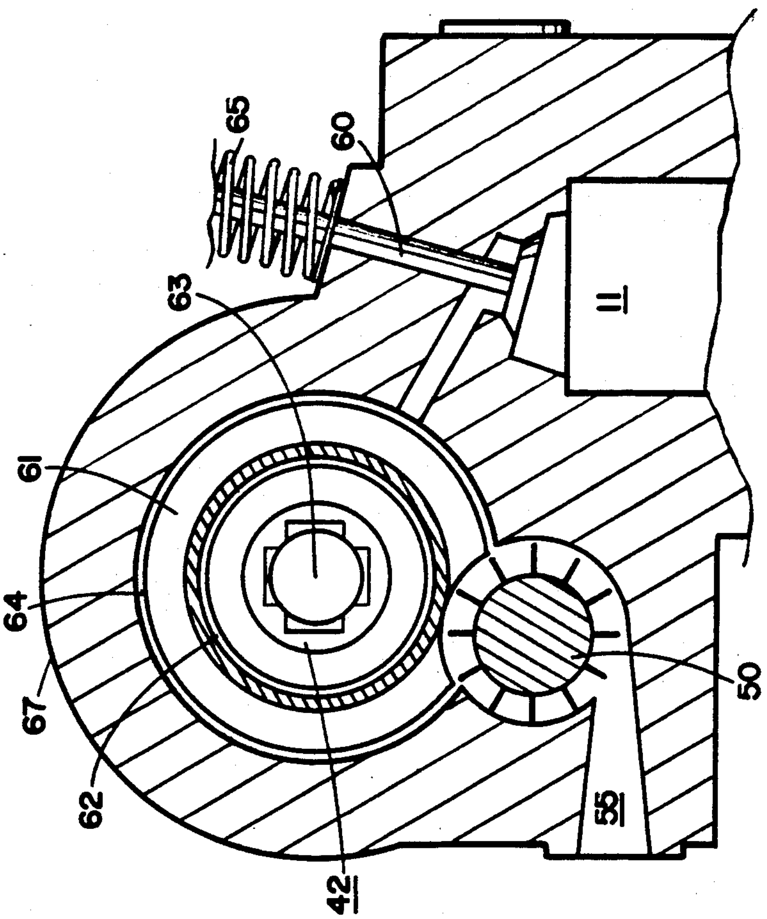
FIG. 12 is a front sectional view of a heated stationary finned cylinder heater unit, as shown in FIG. 10, incorporating intake and exhaust poppet valves and showing the power cylinder intake poppet valve located in the power cylinder.
Figure 11:
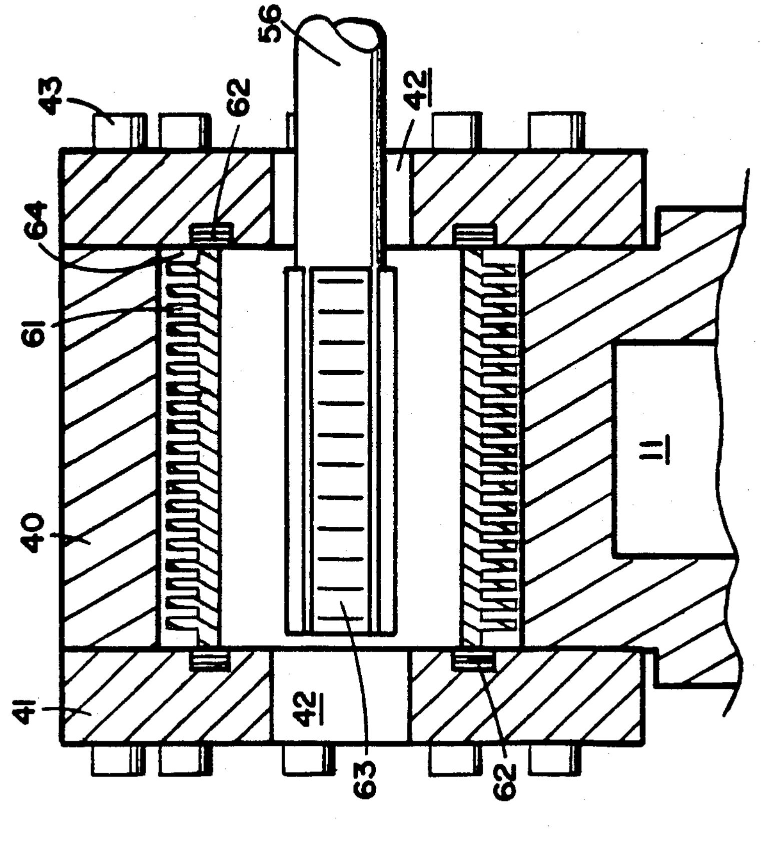
FIG. 11 is a sectional view of the heater housing taken along the line 11—11 of FIG. 10, showing the multi-faced heater burner, stationary fined cylinder and heater flange plates with finned cylinder seals.
Figure 13:
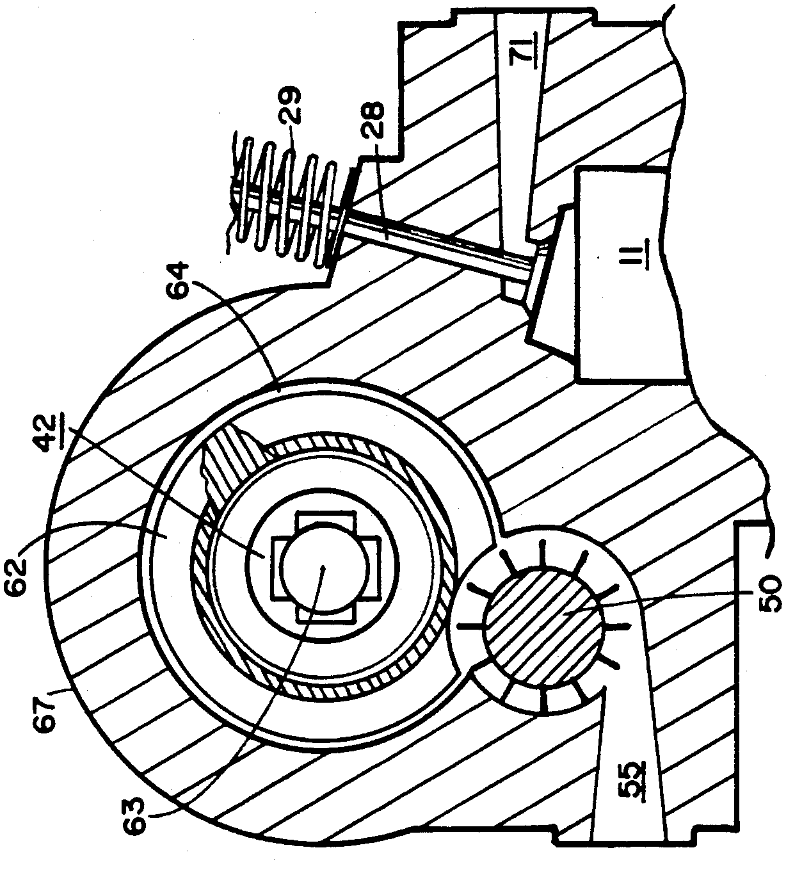
FIG. 13 is the same type heater unit shown in FIG. 12 except the power cylinder exhaust poppet valve is shown in the power cylinder.
Figure 16:
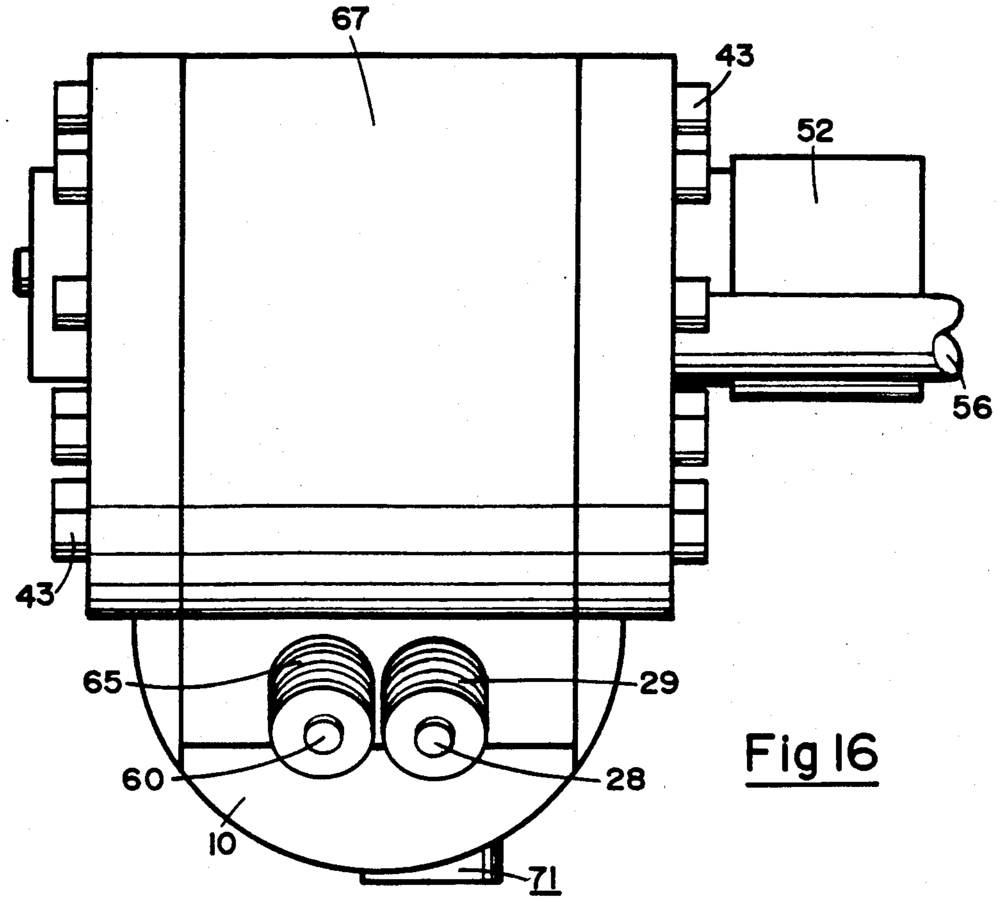
FIG. 16 is a plan view of the heater unit and power cylinder intake and exhaust valves of FIG. 12 and 13.

FIG. 12, 13, and 16 show a heated finned cylinder 61 type heater unit 67 configuration with a power cylinder intake poppet valve 60 and valve spring 65, a power cylinder exhaust valve 28 with spring 29 and exhaust port 71 located in the power cylinder 11.

Figure 14:
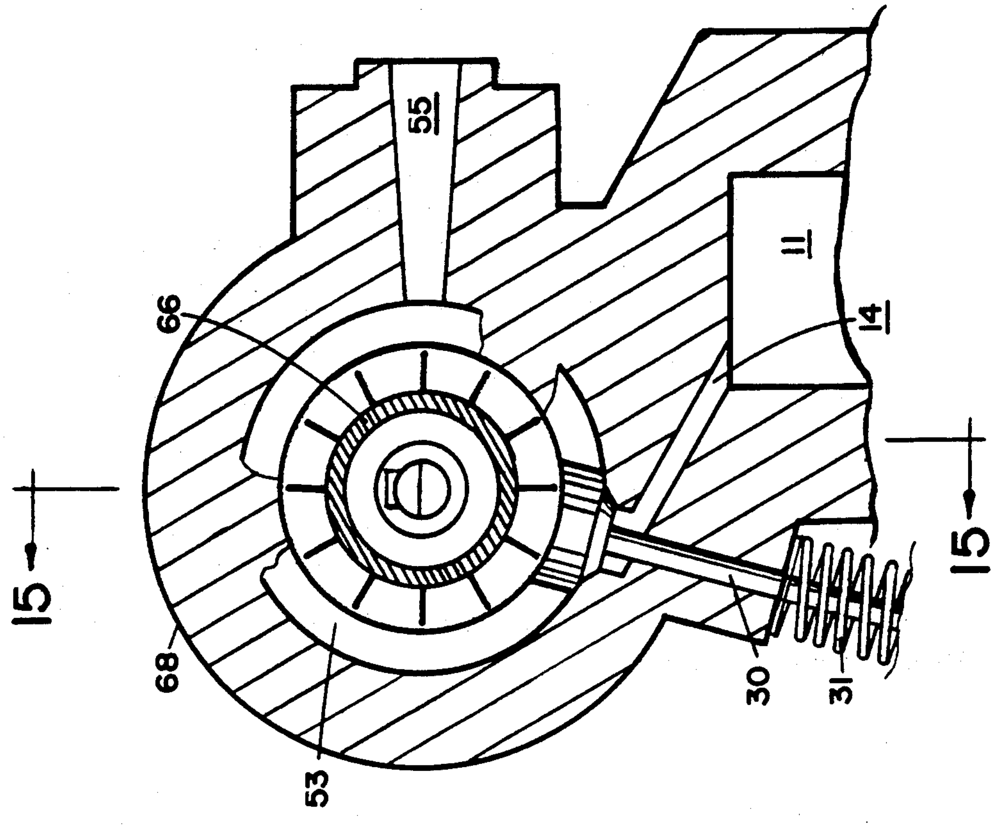
FIG. 14 is a sectional view of the heater unit showing heater housing fins, heater burner, rotating heater blower, heater intake port and power cylinder intake poppet valve.
Figure 15:
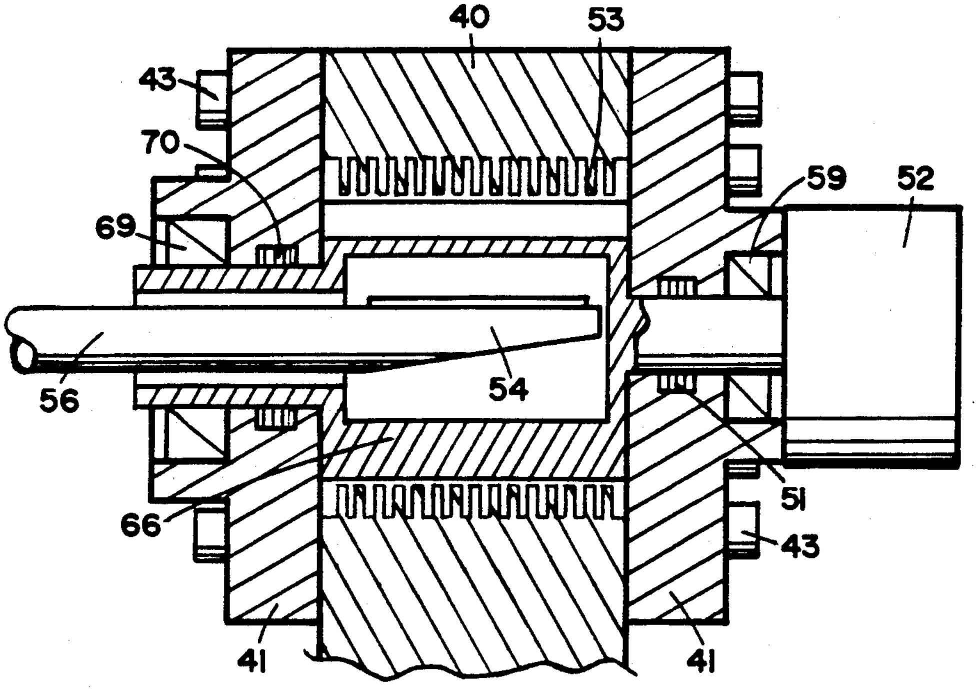
FIG. 15 is a sectional view of the heater housing taken along the line 15—15 of FIG. 14, showing the heater housing fins, heater flange plates, rotating heater blower with seals, bearings, motor and heater burner.

FIG. 14 and 15 illustrate another type of heater unit 68 that eliminates the small heater blower 60 and replaces the external heated heater drum 44 by a large heater blower 66 that utilizes the heater drum motor 49, shaft seals, 45, and bearings 58. The large internally heated blower 66 conducts heat to the surface of the blower 66 and radiates it to the heater housing fins 53. A heater burner 54 is fixed inside the heater blower 66 and exhausts the flue gas past the heater burner 54. See FIG. 15. The heater blower 66 picks up working fluid from the heat exchanger unit 37, mixes and circulates it in the heater housing 40, maintaining the design temperatures and pressures under variable load and RPM.

In the operation of the prime mover, a controlled amount of relative cool and low pressure working fluid is drawn from the accumulator unit 35 by the compressor unit 33, compressing and delivering it by piping 36 to the heat exchanger unit 37 absorbing the residual heat from the power units 10 exhausted working fluid heat deposited in the heat exchanger unit 37. The working fluid continues to flow from the work of the compressor unit 33 and enters the heater unit 39 where the working fluid is circulated at a high velocity by the heater blower 50 over the rotating heater drum 44 and housing fins 53 absorbing heat. The revolving heater drum 44 is heated on its cylindrical surface area by the heater burner 54 and is sealed from the pressure differential of the heater unit 39 and environment by the heater drum seal 46 and heater drum shaft seal 45. See FIG. 3 & 4. The heater housing fins 53 have a high absorptivity and absorbs heat by radiation from the revolving heater drum 44.

As the working fluid circulates inside the heater unit 39 absorbing energy to maintain the designed pressure and temperature, assuming the power piston 17 is at or near TDC when the power cylinder intake valve 12 opens on command allowing working fluid to flow into the power cylinder 11 where it is expanded forcing the power piston 17 downward doing work. As the power piston 17 nears the end of the power stroke the power cylinder exhaust port 16 is uncovered exhausting the working fluid through the piping 36 that communicates to the heat exchanger unit 37 depositing heat through the connecting piping 36 to the cooler 38, still further reducing the working fluids temperature and pressure and dumping it into the accumulator unit 35, completing the cycle of operation. The work created in the power cylinder 11 is coupled to the power crankshaft 22 which is attached to the load and the power compressor coupling 32 driving the compressor unit 33 and other components.

What is claimed is:

1. A closed regenerative cycle engine in which a plurality of fluids are alternately expanded and compressed in closed thermodynamic systems comprising:
   - a power cylinder located in said power unit with a piston reciprocating in said cylinder;
   - a rotatable output crankshaft operatively coupled to said piston mounted perpendicular to said cylindrical axis;
   - a compressor means located on axis of said rotatable output crankshaft mounted adjacent to said power unit;
   - a transmission means operatively coupling said rotatable output crankshaft to said compressor means mounted between said components;
   - an accumulator unit located in the proximity of said compressor means in-flow up stream communicating to said control means and in-flow down stream communicating to said cooler;
   - a working fluid control means mounted in the working fluid piping located adjacent to said compressor means in-flow upstream communicating to said compressor means and in-flow down stream communicating to said accumulator unit;
   - a heat exchanger unit located adjacent to said power unit and compressor means in-flow up stream communicating to said heater unit and in-flow down stream communicating to said compressor means, also in-flow up stream communicating to said cooler and in-flow down stream communicating to said power cylinder;
   - a cooler located adjacent to said compressor means in-flow up stream communicating to said accumulator unit and in-flow down stream communicating to said heat exchanger unit;
   - a heater unit located on said power unit providing a heat source for said working fluid in-flow up stream communicating to said power unit and in-flow down stream communicating to said heat exchanger unit;
   - a rotatable heater drum mounted in said heater housing enclosed and sealed by said heater flange plates;
   - a heater drum seal holder mounted inside of said heater housing contacts and seals said rotatable heater drum minimizing working fluid leakage;
   - a heater burner mounted external of said heater unit protruding into said heater drum seal holder applying heat to said rotatable heater drum;
   - an opening in said heater flange plate to exhaust burned combustibles;
   - a heater blower mounted in said heater housing located parallel to the cylindrical axis of said rotatable heater drum in-flow down stream communicates and moves working fluid from said heat exchanger unit and in-flow up stream communicates and circulates said working fluid over said rotatable heater drum and heater housing fins;
   - a power cylinder intake valve located in said heater housing in-flow up stream communicating to said power cylinder by said power cylinder intake valve passage and in-flow down stream communicating to said heater unit;
   - a power cylinder working fluid exhaust means located on said power cylinder in-flow up stream communicating to said heat exchanger unit and in-flow down stream communicating to said power cylinder;
   - a working fluid make-up means mounted in the proximity of said accumulator unit in-flow up stream communicating to said accumulator unit providing a source of working fluid to said accumulator unit;
   - a first working space defined by said power cylinder and said piston in which a heated working fluid expands to perform work in moving said piston;
   - a second working space defined by said compressor means whereby a cooled working fluid is compressed;

whereby a working fluid is heated by said heater unit, flows into said working space where it expands to perform work, flows through said heat exchanger unit and cooler depositing heat, flows into said accumulator unit where it is pooled, flows through said working fluid control means regulating flow of said working fluid into said compressor means where it is compressed, and thereafter flows through said heat exchanger unit picking up heat, and thence to said heater unit to cyclically perform a closed regenerative cycle.

2. A closed regenerative cycle engine in which a plurality of fluids are alternately expanded and compressed in closed thermodynamic systems comprising:
   - a power cylinder located in said power unit with a piston reciprocating in said cylinder;
   - a rotatable output crankshaft operatively coupled to said piston mounted perpendicular to said cylindrical axis;
   - a compressor means located on axis of said rotatable output crankshaft mounted adjacent to said power unit;
   - a transmission means operatively coupling said rotatable output crankshaft to said compressor means mounted between said components;
   - an accumulator unit located in the proximity of said compressor means in-flow up stream communicating to said control means and in-flow down stream communicating to said cooler;
   - a working fluid control means mounted in the working fluid piping located adjacent to said compressor means in-flow upstream communicating to said compressor means and in-flow down stream communicating to said accumulator unit;
   - a heat exchanger unit located adjacent to said power unit and compressor means in-flow up stream communicating to said heater unit and in-flow down stream communicating to said compressor means, also in-flow up stream communicating to said cooler and in-flow down stream communicating to said power cylinder;

a cooler located adjacent to said compressor means in-flow up stream communicating to said accumulator unit and in-flow down stream communicating to said heat exchanger unit;

a heater unit located on said power unit providing a heat source for said working fluid in-flow up stream communicating to said power unit and in-flow down stream communicating to said heat exchanger unit;

a stationary heater finned cylinder mounted in said heater housing cavity enclosed and sealed by said heater flange plates;

a burner mounted in the proximity of said heater unit located and protruding in and parallel to said stationary heater finned cylinder providing a heat source to said heater unit;

an opening in said heater flange plate to exhaust burned combustibles;

a heater blower mounted in said heater housing located parallel to the cylindrical axis of said stationary heater finned cylinder in-flow down stream communicates and moves working fluid from said heat exchanger unit circulating said working fluid over said stationary heater finned cylinder and heater housing cavity;

a power cylinder intake valve located on said heater housing in-flow up stream communicating to said power cylinder and in-flow down stream communicating to said heater unit;

a power cylinder working fluid exhaust means located on said power cylinder in-flow up stream communicating to said heat exchanger unit and in-flow down stream communicating to said power cylinder;

a working fluid make-up means mounted in the proximity of said accumulator unit in-flow up stream communicating to said accumulator unit providing a source of working fluid to said accumulator unit;

a first working space defined by said power cylinder and said piston in which a heated working fluid expands to perform work in moving said piston;

a second working space defined by said compressor means whereby a cooled working fluid is compressed;

whereby a working fluid is heated by said heater unit, flows into said working space where it expands to perform work, flows through said heat exchanger unit and cooler depositing heat, flows into said accumulator unit where it is pooled, flows through said working fluid control means regulating flow of said working fluid into said compressor means where it is compressed, and thereafter flows through said heat exchanger unit picking up heat, and thence to said heater unit to cyclically perform a closed regenerative cycle.

3. A closed regenerative cycle engine in which a plurality of fluids are alternately expanded and compressed in closed thermodynamic systems comprising:

a power cylinder located in said power unit with a piston reciprocating in said cylinder;

a rotatable output crankshaft operatively coupled to said piston mounted perpendicular to said cylindrical axis;

a compressor means located on axis of said rotatable output crankshaft mounted adjacent to said power unit;

a transmission means operatively coupling said rotatable output crankshaft to said compressor means mounted between said components;

an accumulator unit located in the proximity of said compressor means in-flow up stream communicating to said control means and in-flow down stream communicating to said cooler;

a working fluid control means mounted in the working fluid piping located adjacent to said compressor means in-flow upstream communicating to said compressor means and in-flow down stream communicating to said accumulator unit;

a heat exchanger unit located adjacent to said power unit and compressor means in-flow up stream communicating to said heater unit and in-flow down stream communicating to said compressor means, also in-flow up stream communicating to said cooler and in-flow down stream communicating to said power cylinder;

a cooler located adjacent to said compressor means in-flow up stream communicating to said accumulator unit and in-flow down stream communicating to said heat exchanger unit;

a heater unit located on said power unit providing a heat source for said working fluid in-flow up stream communicating to said power unit and in-flow down stream communicating to said heat exchanger unit;

an internal heated heater blower mounted in said heater housing enclosed and sealed by said heater flange plates;

a burner mounted in the proximity of said heater unit located and protruding in and parallel to said internal heated heater blower providing a heat source to said heater unit;

an opening in said heater flange plate to exhaust burned combustibles;

a power cylinder intake valve located on said heater housing in-flow up stream communicating to said power cylinder and in-flow down stream communicating to said heater unit;

a power cylinder working fluid exhaust means located on said power cylinder in-flow up stream communicating to said heat exchanger unit and in-flow down stream communicating to said power cylinder;

a working fluid make-up means mounted in the proximity of said accumulator unit in-flow up stream communicating to said accumulator unit providing a source of working fluid to said accumulator unit;

a first working space defined by said power cylinder and said piston in which a heated working fluid expands to perform work in moving said piston;

a second working space defined by said compressor means whereby a cooled working fluid is compressed;

whereby a working fluid is heated by said heater unit, flows into said working space where it expands to perform work, flows through said heat exchanger unit and cooler depositing heat, flows into said accumulator unit where it is pooled, flows through said working fluid control means regulating flow of said working fluid into said compressor means where it is compressed, and thereafter flows through said heat exchanger unit picking up heat, and thence to said heater unit to cyclically perform a closed regenerative cycle.

* * * * *